United States Patent [19]
Ward

[11] Patent Number: 5,885,008
[45] Date of Patent: *Mar. 23, 1999

[54] PLASTIC BEARING WITH LUBRICATING STRIP

[76] Inventor: Michael G. Ward, 725 Oak Meadow Ct., Lake Oswego, Oreg. 97034

[ * ] Notice: This patent issued on a continued prosecution application filed under 37 CFR 1.53(d), and is subject to the twenty year patent term provisions of 35 U.S.C. 154(a)(2).

[21] Appl. No.: 531,741

[22] Filed: Sep. 20, 1995

[51] Int. Cl.$^6$ .................................................. F16C 33/02
[52] U.S. Cl. ............................ 384/291; 384/297; 384/299
[58] Field of Search ..................................... 384/283, 291, 384/292, 297, 298, 299, 300

[56] References Cited

U.S. PATENT DOCUMENTS

| | | | |
|---|---|---|---|
| 1,398,219 | 11/1921 | Acheson | 384/283 |
| 2,815,253 | 12/1957 | Spriggs | 384/299 |
| 4,492,415 | 1/1985 | Baile et al. | 384/463 |

*Primary Examiner*—Lenard A. Footland
*Attorney, Agent, or Firm*—Keith A. Cushing

[57] ABSTRACT

A plastic bearing and plastic conveyor guide track include a lubricating site formed by an oil saturated polymer. In a plastic bearing, a lubricating strip resides in contact with a shaft rotatably supported by the shaft. In the guide track, oil saturated polymer elements are inserted prior to machining and are exposed at selected guide features during machining. Enhanced lubrication results without sacrificing the load bearing capabilities of the plastic material forming the bearing or guide track body.

1 Claim, 4 Drawing Sheets

PLASTIC BEARING WITH LUBRICATING STRIP

BACKGROUND OF THE INVENTION

The present invention relates generally to bearing manufacture and structure, and in particular to plastic bearing and manufacture.

Plastic bearings provide an alternative to metallic counterparts where wet or harsh environments are encountered and where low maintenance is required. In food processing applications, plastic bearings operate without a grease lubricant as required in metallic bearings. Plastic bearings are more compatible for certain chemical applications relative to metallic bearings. Plastic components can out perform metallic components in many situations, especially in dirty, dusty and contaminated environments. Little or no lubrication is required as most parts made of industrial plastic have, to a limited extent, self-lubricating properties.

Many plastic components are inherently low friction materials. Some plastic bearing components are impregnated with a lubricant, e.g., oil. Oil impregnated plastics include pockets of oil imbedded in the plastic material. Upon machining to final form, some oil pockets are exposed and provide a limited source of lubrication. In particular, the amount of lubricant delivered is limited by the number of oil pockets exposed in machining the part. Eventually, use of the part exhausts the lubricant supply, and the part eventually fails.

Furthermore, plastic bearings must be of significant rigidity to carry a load during operation. As oil is impregnated into the plastic rigidity is lost, and loading capabilities diminish. In other words, a high concentration of lubricant lessens the compressive strength of plastics.

Similar considerations apply to other plastic devices such as plastic conveyors. A plastic conveyor includes a guide track and a chain carried thereon. Such plastic conveyors may be constructed of materials similar to the above-described plastic bearings and use of grease as a lubricating agent is undesirable in many applications. Further, load bearing capability is diminished when significant lubricant is impregnated into the plastic conveyor elements.

It would be desirable, therefore, to provide an alternate form of lubrication in a plastic products without packing grease into, for example, bearings or conveyor elements, and without sacrificing an ability to carry a significant load during operation.

SUMMARY OF THE INVENTION

A plastic bearing under the present invention includes a plastic body defining a bore. The bore has formed therein at least one channel. A lubricating strip placed within the at least one channel includes an exposed surface concurrent with the bore surface as a lubricating site.

A method of manufacturing a conveyor under the present invention begins with a plastic block with apertures for receiving lubricating elements. The apertures are placed in relation to specific features of a final machined part. Lubricating elements are placed in the apertures and the block is machined into said the final machined part. The machining step includes exposing portions of the lubricating elements. A conveyor mounts upon the final machined product and includes portions moving past and in contact with the exposed surfaces of the lubricating elements.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention will be illustrated in the context of several specific plastic bearings. As used herein, the term "plastic bearing" shall include a wide variety of materials including but not limited to ultra high molecular weight polyethylene (UHMW-PE), oil filled UHMW-PE, nylon, or glass-filled $MoS_2$ polymeric materials. Such materials are generally characterized as low friction, moisture resistant, non-stick, and sanitary. Further, such materials may be of sufficient hardness to carry significant loads during operation.

The present invention further includes a lubricating strip delivering lubricant during operation. The lubricating strip need not be of high density or durometer, its function being lubricant delivery not load bearing. As used herein, the term "lubricating strip" shall refer to a material such as an oil saturated polymer. For example, such oil saturated polymer is available under the registered trademark MICROPOLY and is manufactured by PhyMet, Inc. of Springboro, Ohio. The oil saturated polymer lubricant is a solid material, but is an oily porous polymer. Under the present invention, the oil saturated polymer is first formed as stock material of given shape, then integrated into the structure of, for example, a plastic bearing to establish a lubrication site. The lubricating strip material advantageously delivers more lubricant than that initially present at its exposed surfaces, i.e., lubricant migrates from within the oil saturated polymer to its exterior surfaces.

Figure 1:
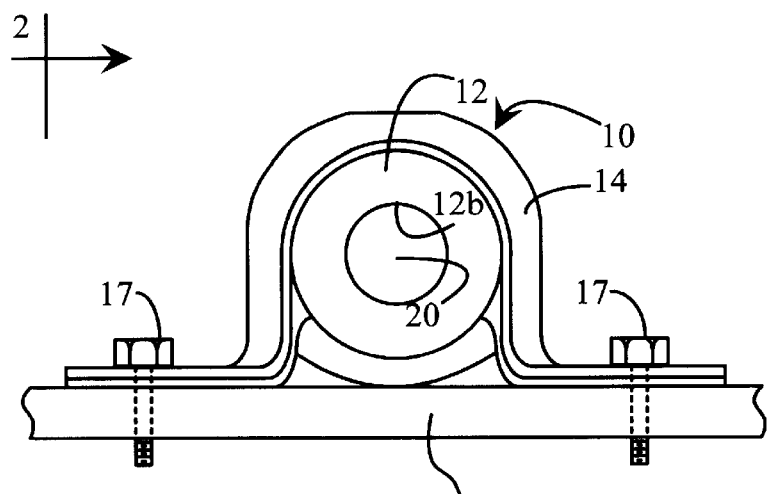
FIG. 1 illustrates a self aligning bearing insert, including a lubricating strip under the present invention, and steel mounting brackets therefor.
Figure 2:
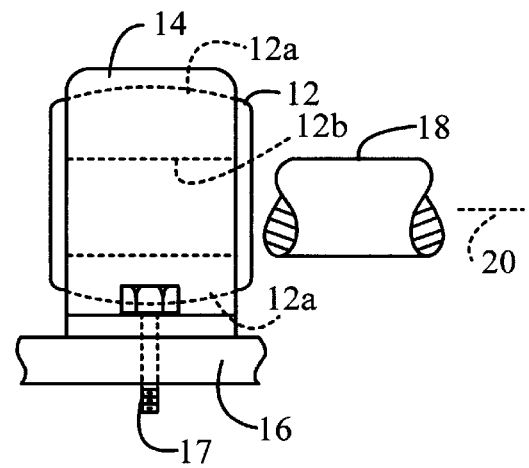
FIG. 2 illustrates the bearing of FIG. 1 as taken along lines 2—2 of FIG. 1.

FIGS. 1–4 illustrate a first embodiment of the present invention as applied to a pillow block style bearing 10. With reference to FIGS. 1 and 2, bearing 10 includes an ultra high molecular weight (UHMW) plastic bearing insert 12 and a steel mounting bracket 14. The exterior surface 12a of insert 12 is spherical and thereby establishes a self-aligning relationship to the steel mounting bracket 14 in contact therewith. Bracket 14 attaches to a structure 16 by means of mounting bolts 17. Bearing insert 12 includes a central bore 12b defining an inward-facing cylindrical surface. Bore 12b receives a shaft or journal 18 thereby establishing an axis of rotation 20 for shaft 18 relative to structure 16.

Figure 3:
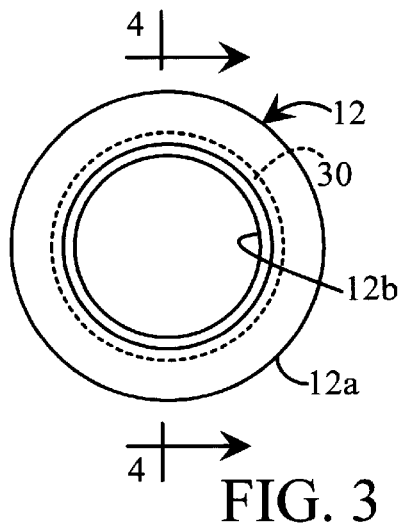
FIG. 3 illustrates the bearing insert of FIG. 1 as removed from the steel mounting brackets.
Figure 4:
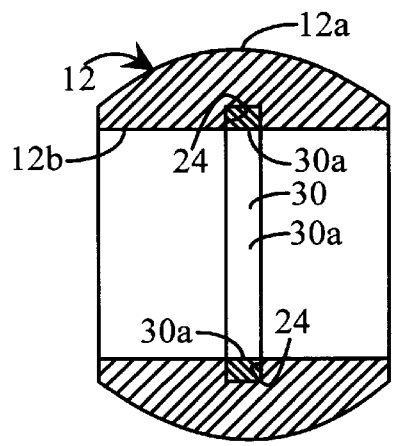
FIG. 4 illustrates in cross-section the bearing insert of FIG. 3 as taken along lines 4—4 of FIG. 3.

FIG. 3 illustrates separately the bearing insert 12 and FIG. 4 shows bearing insert 12 in cross-section. At approximately mid-distance along bore 12b, an annular channel 24 centered about axis 20 receives a lubricating strip 30 therein. Strip 30 is square-cross section stock material corresponding in dimension to channel 24 and cut to a length equal to the circumference of channel 24. As placed within channel 24, lubricating strip 30 assumes an annular configuration centered about axis 20. Strip 30 includes an exposed surface 30a concurrent with the inward-facing cylindrical surface of bore 12b.

Thus, lubricating strip 30 resides within insert 12 and maintains contact with shaft 18 as placed therein. Strip 30 need not carry the load assumed by bearing 10, but delivers lubricating material at the interface between the external surface of shaft 18 and bore 12b. In operation, as shaft 18 rotates about axis 20 such lubricating material disperses along bore 12b thereby reducing friction between bore 12b and shaft 18. Such lubrication thereby significantly extends the service life for bearing insert 12.

Figure 5:
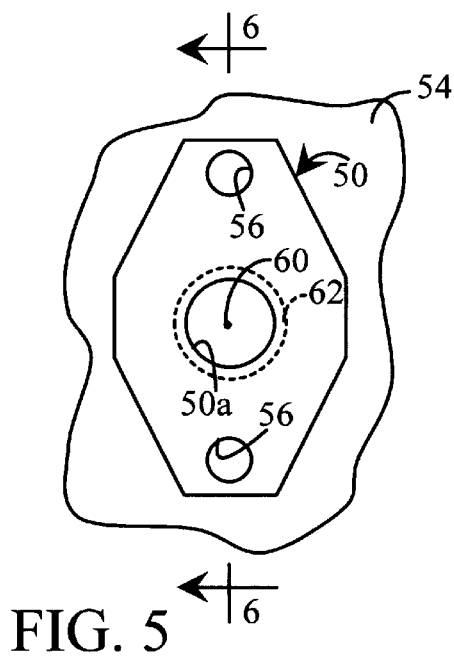
FIG. 5 illustrates a block bearing including a lubricating strip under the present invention.
Figure 6:
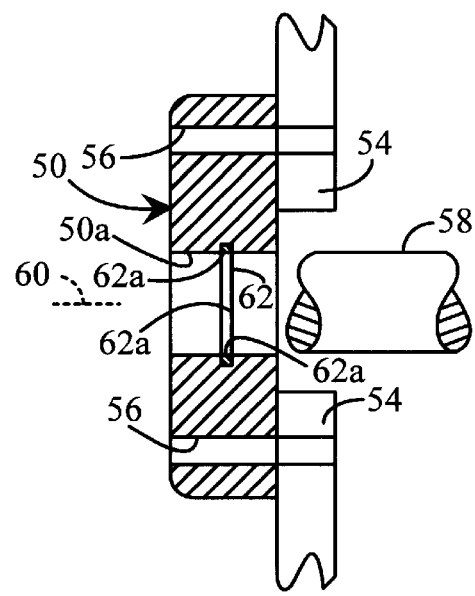
FIG. 6 illustrates the block bearing of FIG. 5 as taken along lines 6—6 of FIG. 5.

FIGS. 5 and 6 illustrate a second bearing under the present invention, a block bearing 50 including a lubricating strip 62. In FIG. 5, block bearing 50 mounts to a structure 54 by means of bolts (not shown) placed within mounting holes 56. Bearing 50 includes a central bore 50a defining an inward-facing cylindrical surface receiving therein a shaft or journal 58 for rotation about axis 60.

Within bore 50a, e.g., approximately mid-distance therethrough, an annular channel cut into the cylindrical surface of bore 50a receives lubricating strip 62. Lubricating strip 62 includes an exposed surface 62a defining a portion of the inward-facing cylindrical surface of bore 50a. Lubricating strip 62 thereby delivers within bore 50a lubrication relative to shaft 58 when placed therein. In this manner, the service life for bearing 50 extends significantly beyond similar plastic bearings without a lubricating strip 62.

It is believed that the service life for a plastic bearing including a lubricating strip under the present invention is at least double that of an ordinary plastic bearing.

Figure 7:
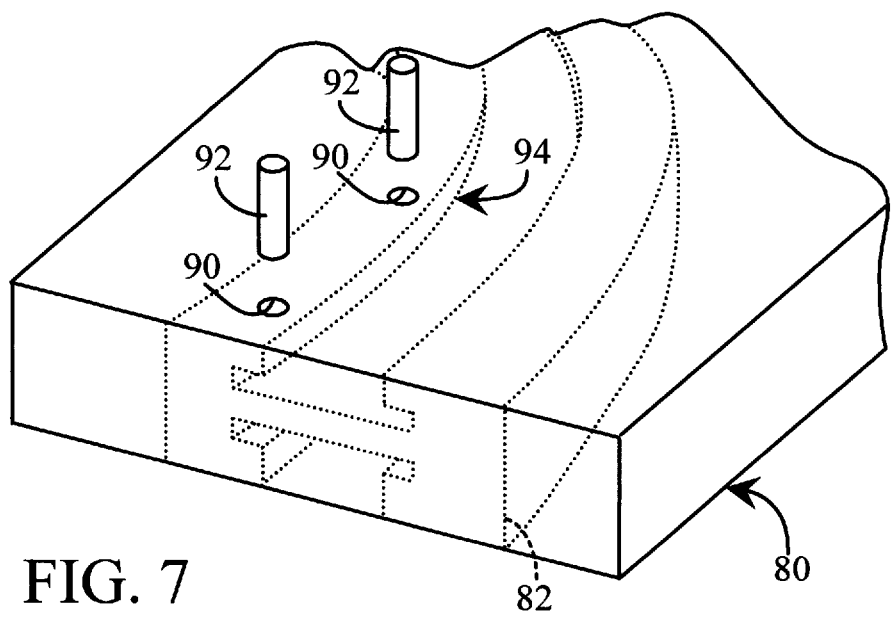
FIG. 7 illustrates plastic block material prior to machining in the form of a track guide and also illustrates incorporation of lubricating dowels therein.

FIG. 7 illustrates a plastic block 80 from which a guide track 82 (shown in phantom in FIG. 7) will be formed by machining block 80. Block 80 may comprise a variety of materials, e.g., including but not limited to ultra high molecular weight polyethylene (UHMW-PE), oil filled UHMW-PE, nylon, or glass-filled MoS$_2$ polymeric. Prior to machining block 80, however, a number of lubricating dowels 92 are placed at particular locations in block 80, i.e., locations relative to features of guide track 82. Lubricating dowels 92 are formed of material similar the above-described lubricating strips 30 and 62, i.e., an oil saturated polymer.

A number of holes 90 are drilled in block 80 at locations corresponding to particular features of the intended guide track 82 structure. Lubricating dowels 92 are then placed within holes 90. In this manner, lubrication sites are established relative to particular guide features of the final machined part. As illustrated in FIG. 7, dowels 92 are placed on the inside edge of a curved guide feature 94 of guide track 82. While only two such dowels 92 are illustrated in FIG. 7, it will be understood that any number of such lubricating dowels 92 may be placed in a variety of locations relative to features of the final machined part. In other words, lubricating sites are placed where needed in the final machine part.

Figure 8:
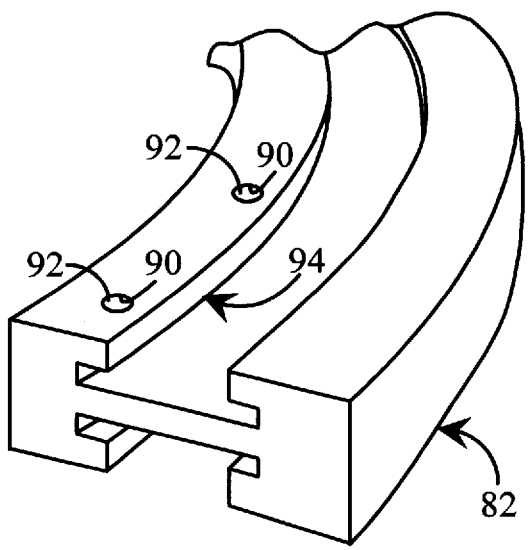
FIG. 8 illustrates the track guide as machined from the plastic block material of FIG. 7.
Figure 9:
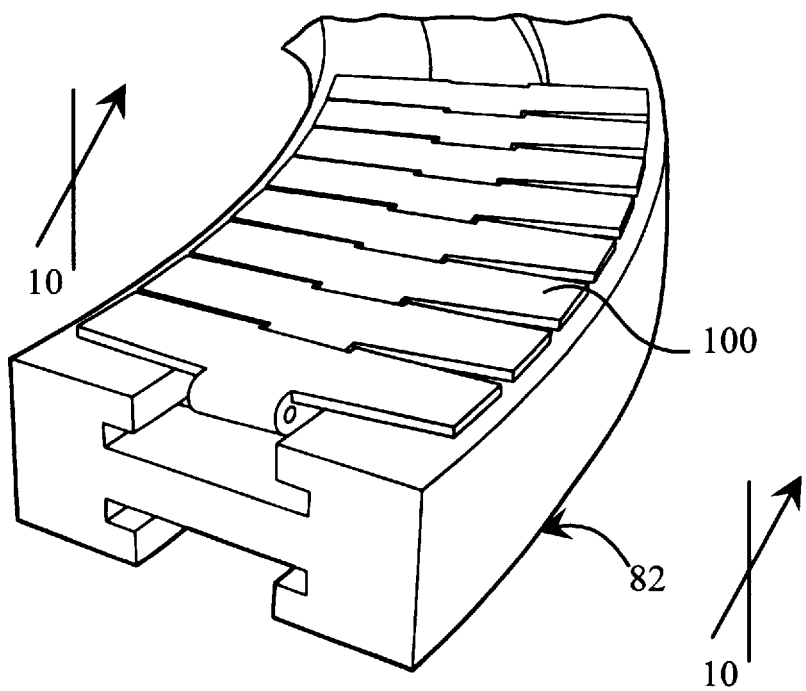
FIG. 9 illustrates the track guide of FIG. 8 as the final product including a conveyor chain carried thereon.

FIG. 8 illustrates guide track 82 following the manufacturing steps of drilling holes 90, inserting lubricating dowels 92 therein, and machining the final guide track 82. FIG. 9 illustrates guide track 82 carrying thereon a flexible conveyor chain 100.

Figure 10:
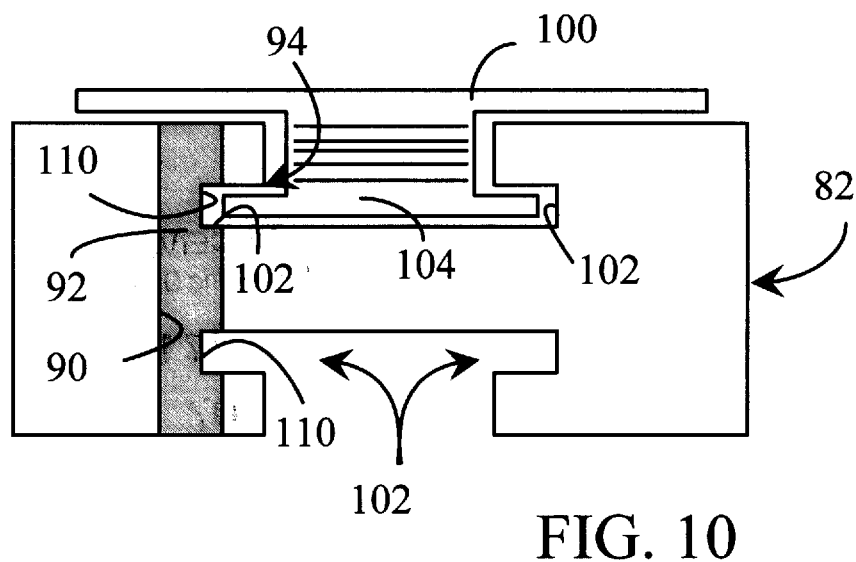
FIG. 10 illustrates in cross-section the track guide and conveyor chain as taken along lines 10—10 of FIG. 9.

FIG. 10 illustrates in cross-section the relationship between guide features of guide track 82, exposed portions of lubricating dowels 92 establishing lubrications sites relative to chain 100. In FIG. 10, guide feature 94 of guide track 82 defines a lateral groove 102 receiving chain portion 104 therein. As may be appreciated, chain portion 104 supports the chain 100 allowing chain 100 to move along a specific path. A similar groove 102 is formed on the under-surface of guide track 82. In the particular guide track 82 illustrated, chain 100 travels in one direction on top of guide track 82 and travels in the opposite direction underneath guide track 82 along a return path. As illustrated in FIG. 10, lubrication sites 110 are established in each of grooves 102 where a lubricating dowel 92 is exposed during machining of a groove 102. As chain 100 travels along guide track 82, exposed portions of lubricating dowels 92 deliver lubricant thereby enhancing the service life and operation of guide track 82.

While a specific guide track 82 and specific locations for lubricating dowels 92 are illustrated herein, it will be understood that a variety of guide structures may be formed with lubrication sites established at selected locations, e.g., locations requiring enhanced lubrication, by appropriate placement of lubricating dowels 92 in relation to particular features of the final machined product.

It will be appreciated that the present invention is not restricted to the particular embodiment that has been described and illustrated, and that variations may be made therein without departing from the scope of the invention as found in the appended claims and equivalents thereof.

What is claimed is:

1. A plastic plane bearing comprising:

a plastic body of at least one of nylon, UHMW-PE, and polyethylene defining a bore for receiving a shaft therethrough, said bore having formed therein at least one channel, said body being of a given compressibility sufficient for receiving a loading force directly from said shaft when placed in said bore, said body having a given magnitude oil saturability; and a liquid-oil saturated porous polymer lubricating strip within said at least one channel, said lubricating strip being impregnated with a liquid lubricant and positioned for direct contact against said shaft when placed in said bore, said strip allowing migration of oil therein to said shaft when said shaft is placed in said bore, said lubricating strip being of significantly less compressibility relative to said given compressibility, said body receiving substantially all of said loading force and protecting said strip against significant loading force compression, said lubricating strip having a significantly greater magnitude oil saturability relative to said given magnitude oil saturability, said lubricating strip increasing lubrication of said bearing relative to lubrication provided by said plastic body alone.

* * * * *